United States Patent
Feulner et al.

(10) Patent No.: US 10,495,006 B2
(45) Date of Patent: Dec. 3, 2019

(54) VARIABLE GEOMETRY GAS TURBINE ENGINE FOR USE IN INCLEMENT WEATHER

(71) Applicant: UNITED TECHNOLOGIES CORPORATION, Farmington, CT (US)

(72) Inventors: Matthew R. Feulner, West Hardford, CT (US); Roxanne M. Bochar, Manchester, CT (US); Stefan M. Poth, Jr., South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 527 days.

(21) Appl. No.: 14/616,369

(22) Filed: Feb. 6, 2015

(65) Prior Publication Data

US 2016/0230677 A1    Aug. 11, 2016

(51) Int. Cl.
| | |
|---|---|
| *F02C 9/28* | (2006.01) |
| *F02C 7/042* | (2006.01) |
| *F04D 27/02* | (2006.01) |
| *F01D 17/16* | (2006.01) |

(52) U.S. Cl.
CPC ............... *F02C 9/28* (2013.01); *F02C 7/042* (2013.01); *F05D 2270/311* (2013.01); *F05D 2270/313* (2013.01)

(58) Field of Classification Search
CPC .... F02C 9/28; F02C 7/042; F02C 9/20; F04D 27/0246; F01D 17/162; F05D 2270/311; F05D 2270/313; F05D 2270/096
See application file for complete search history.

(56) References Cited

U.S. PATENT DOCUMENTS

| | | | |
|---|---|---|---|
| 7,174,704 B2* | 2/2007 | Renggli | F02K 1/09 239/265.33 |
| 8,452,516 B1 | 5/2013 | Rose et al. | |
| 2011/0208400 A1* | 8/2011 | Lickfold | F02C 9/32 701/100 |
| 2013/0192247 A1 | 8/2013 | Blackwell et al. | |
| 2013/0255221 A1 | 10/2013 | Gaully et al. | |

FOREIGN PATENT DOCUMENTS

EP    2305958 A2    4/2011

OTHER PUBLICATIONS

European Search Report for EP Application No. 16154540.
Office Action for European Application No. 16154540.5; Application Filing Date Feb. 5, 2016; dated Feb. 22, 2019 (7 pages).

* cited by examiner

*Primary Examiner* — Janie M Loeppke
(74) *Attorney, Agent, or Firm* — Cantor Colburn LLP

(57) ABSTRACT

A variable-geometry system for a gas turbine engine can be used to improve operations in various inclement weather conditions. This may be achieved by varying the orientation of an element in a gas turbine engine flowpath in response to a comparison between sensor-gathered parameter data and stored parameter values and ranges using a pre-programmed algorithm. The orientation of the element may be infinitely variable within a range of orientations.

6 Claims, 6 Drawing Sheets

VARIABLE GEOMETRY GAS TURBINE ENGINE FOR USE IN INCLEMENT WEATHER

TECHNICAL FIELD

This disclosure generally relates to gas turbine engines and, more particularly, relates to a variable-geometry system for a gas turbine engine.

BACKGROUND

Many modern aircraft, as well as other vehicles and industrial processes, employ gas turbine engines for generating energy and propulsion. Such engines include a compressor, combustor and turbine, and in some cases a fan, provided in serial fashion, forming an engine core and arranged along a central longitudinal axis. Air enters the gas turbine engine through the front end and is pressurized in the compressor. This pressurized air is mixed with fuel in the combustor. The fuel-air mixture is then ignited, generating hot combustion gases that flow downstream to the turbine. The turbine is driven by the exhaust gases and mechanically powers the compressor and fan via a central rotating shaft. Energy from the combustion gases not used by the turbine is discharged through an exhaust nozzle, producing thrust to power the aircraft.

Gas turbine engines contain an engine core and fan surrounded by a fan case, forming part of a nacelle. The nacelle is a housing that contains the engine. The fan is positioned forward of the engine core and within the fan case. The engine core is surrounded by an engine core cowl and the area between the nacelle and the engine core cowl is functionally defined as a fan duct. The fan duct is substantially annular in shape to accommodate the airflow from the fan and around the engine core cowl. The airflow through the fan duct, known as bypass air, travels the length of the fan duct and exits at the aft end of the fan duct at an exhaust nozzle.

In addition to thrust generated by combustion gasses, the fan of gas turbine engines also produces thrust by accelerating and discharging ambient air through the exhaust nozzle. Various parts of the gas turbine engine generate heat while operating, including the compressor, combustor, turbine, central rotating shaft and fan. To maintain proper operational temperatures, excess heat is often removed from the engine via oil coolant loops, including air/oil or fuel/oil heat exchangers, and dumped into the bypass airflow for removal from the system.

In operation, the gas turbine engine may encounter a variety of weather conditions, including fog, ground freezing fog, hail, icing and rain. All of such inclement weather conditions can adversely affect engine operation. Currently, gas turbine engines have a limited ability to modify their operation to best address such conditions.

Accordingly, there is a need for an improved variable-geometry system for a gas turbine engine better able to operate under inclement weather conditions.

SUMMARY OF THE DISCLOSURE

To meet the needs described above and others, the present disclosure provides a variable-geometry system for a gas turbine engine that may comprise a sensor configured to sense a parameter, a control system in electronic communication with the sensor, the control system including a pre-programmed algorithm and configured to compare data from the sensor to stored parameter values and ranges, a mechanism in communication with the control system, and an element in a flow path of the gas turbine engine, wherein the mechanism is configured to vary an orientation of the element in response to the pre-programmed algorithm and the control system's comparison between data from the sensor and the stored parameter values and ranges, wherein the orientation of the element is infinitely variable within a range of orientations.

The control system may be configured to associate a particular element orientation with a potential adverse condition derived from the comparison between data from the sensor and the stored parameter values and ranges, and the parameter may be selected from the group consisting of total temperature, water content of ambient air, airspeed, altitude or weight-on-wheels.

The variable-geometry system may further include a plurality of sensors for sensing a plurality of parameters, wherein the control system includes a pre-programmed algorithm for a plurality of parameters and is able to compare data from the plurality of sensors to stored parameter values and ranges, wherein the mechanism varies an orientation of the element in response to a control system's comparison between data from the plurality of sensors and the stored parameter values and ranges. The control system may be configured to associate a particular element orientation with a potential adverse condition derived from the comparison between the stored parameter values and the data from the plurality of sensors. Further, the plurality of parameters may be selected from the group consisting of total temperature, water content of ambient air, airspeed, altitude or weight-on-wheels.

The gas turbine engine may include a plurality of elements and a plurality of mechanisms, and the mechanisms may be configured to vary the orientations of the elements in response to the control system's comparison between data from the sensor and the stored parameter values and ranges. Also, the potential adverse condition may be selected from the group consisting of ground freezing fog, glaze ice, rime ice, hail, rain or ice crystals.

The present disclosure also provides a gas turbine engine that may comprise a compressor, a sensor configured to sense a parameter, a control system in electronic communication with the sensor, the control system including a pre-programmed algorithm and configured to compare data from the sensor to stored parameter values and ranges, a mechanism in communication with the control system, an element in a flow path of the gas turbine engine, wherein the mechanism is configured to vary an orientation of the element in response to the pre-programmed algorithm and the control system's comparison between data from the sensor and the stored parameter values and ranges, wherein the orientation of the element is infinitely variable within a range of orientations, a combustor downstream of the compressor, and a turbine downstream of the combustor.

The control system may associate a particular element orientation with a potential adverse condition derived from the comparison between the data from the sensor and the stored parameter values and ranges. Additionally, the parameter may be selected from the group consisting of total temperature, water content of ambient air, airspeed, altitude or weight-on-wheels.

The gas turbine engine may further include a plurality of sensors configured to sense a plurality of parameters, wherein the control system includes a pre-programmed algorithm for a plurality of parameters and is configured to compare data from the plurality of sensors to stored parameter values and ranges, wherein the mechanism varies an orientation of the element in response to a control system's comparison between data from the plurality of sensors and the stored parameter values and ranges. The control system may be configured to associate a particular element orientation with a potential adverse condition derived from the comparison between the data from the plurality of sensors and the stored parameter values and ranges.

The plurality of parameters may be selected from the group consisting of total temperature, water content of ambient air, airspeed, altitude or weight-on-wheels. The element may be a vane located upstream of a compressor blade, or may be a vane located upstream of a fan.

The gas turbine engine may also include a plurality of elements and a plurality of mechanisms, and the mechanisms vary the orientations of the elements in response to the control system's comparison between data from the sensor and the stored parameter values and ranges. The potential adverse condition may be selected from the group consisting of ground freezing fog, glaze ice, rime ice, hail, rain or ice crystals.

The present disclosure further provides a method of scheduling vane orientation in a gas turbine engine, that may comprise determining a measurement of a parameter, comparing the measurement to stored parameter values and ranges in a control system, analyzing the comparison by a pre-programmed algorithm in the control system, communicating the resulting analysis to a mechanism, and varying the orientation of an element in a flow path of the gas turbine engine with the mechanism in response to the analysis, wherein an orientation of the element is infinitely variable within a range of orientations, and wherein the control system associates a particular element orientation with a potential adverse condition derived from the analysis.

The method may also include determining a plurality of measurements for a plurality of parameters, wherein the control system includes a pre-programmed algorithm for a plurality of parameters and is able to compare the plurality of measurements to the stored parameter values and ranges, wherein the mechanism varies an orientation of the element in response to the control system's comparison between the plurality of measurements and the stored parameter values and ranges, wherein the control system associates a particular element orientation with a potential adverse condition derived from the analysis.

These, and other aspects and features of the present disclosure, will be better understood upon reading the following detailed description when taken in conjunction with the accompanying drawings.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only exemplary embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
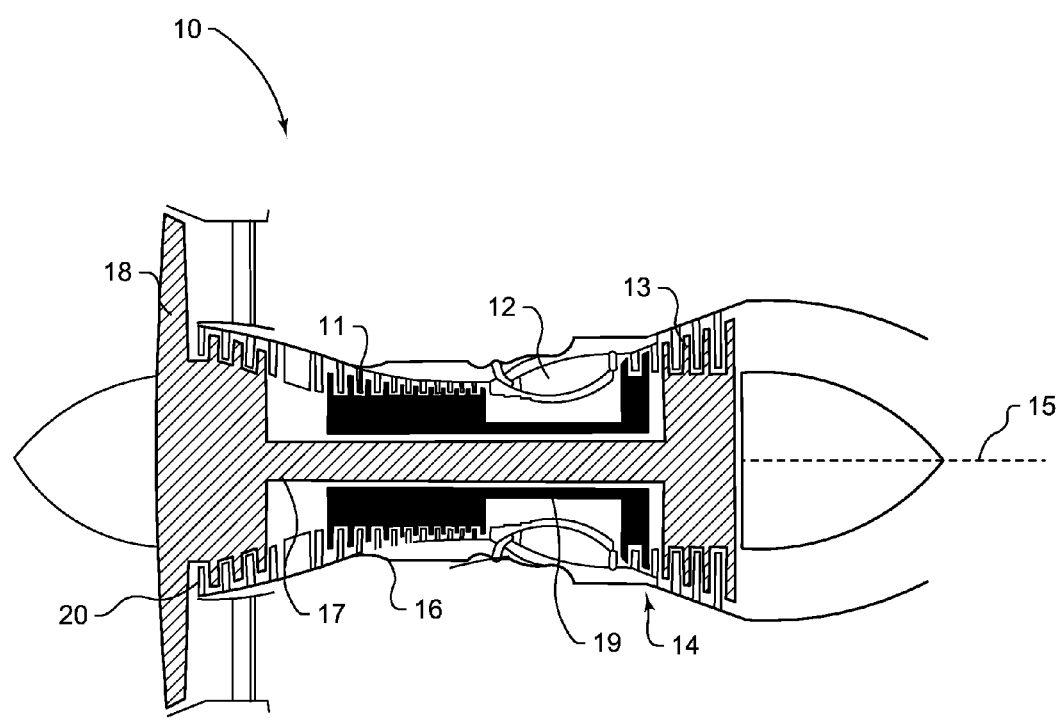
FIG. 1 is a sectional view of a gas turbine engine constructed in accordance with an embodiment.

Turning now to the drawings, and with specific reference to FIG. 1, a gas turbine engine constructed in accordance with the present disclosure is generally referred to by reference numeral 10. The gas turbine engine 10 includes a compressor 11, combustor 12 and turbine 13, known as the engine core 14, lying along a central longitudinal axis 15, and surrounded by an engine core cowl 16. The compressor 11 is connected to the turbine 13 via a central rotating shaft 17. Additionally, in a typical multi-spool design, plural turbine 13 sections are connected to, and drive, corresponding plural sections of the compressor 11 and a fan 18 via the central rotating shaft 17 and a concentric rotating shaft 19, enabling increased compression efficiency.

As is well known by those skilled in the art, ambient air enters the compressor 11 at an inlet 20, is pressurized, and is then directed to the combustor 12, mixed with fuel and combusted. This generates combustion gases that flow downstream to the turbine 13, which extracts kinetic energy from the exhausted combustion gases. The turbine 13, via central rotating shaft 17 and concentric rotating shaft 19, drives the compressor 11 and the fan 18, which draws in ambient air. Thrust is produced both by ambient air accelerated aft by the fan 18 and by exhaust gasses exiting from the engine core 14.

Figure 2:
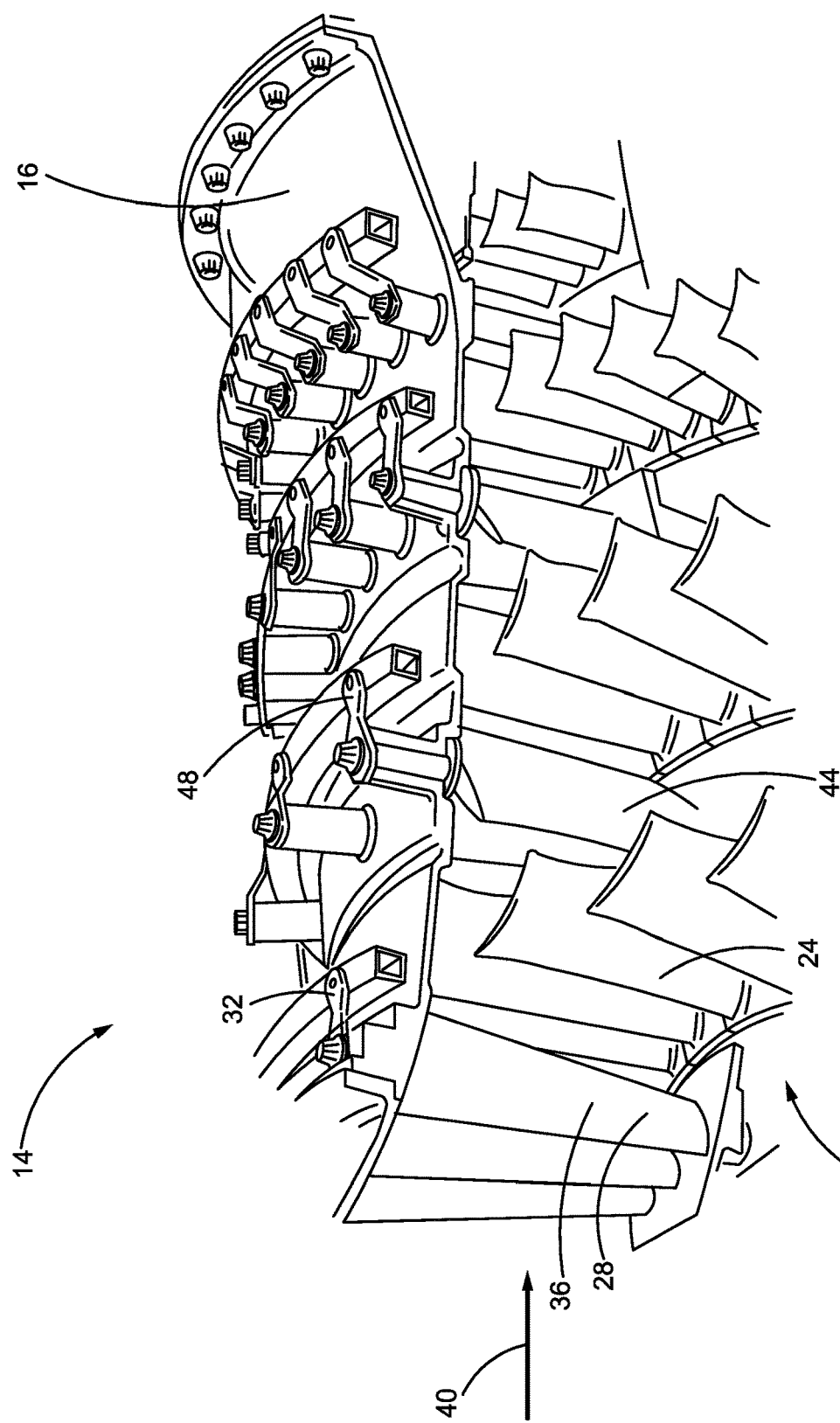
FIG. 2 is a perspective view of the gas turbine engine of FIG. 1 constructed in accordance with an embodiment.

The engine core 14 and engine core cowl 16 may surround a compressor 11 having compressor blade 24, as shown in FIG. 2. An element 28 is also shown. A mechanism 32 may be in mechanical or electrical communication with the element 28, and may vary the orientation of the element 28. The element 28 may be a vane 36 as shown in FIG. 2, but it is to be understood that in this context, the element 28 may be any number of different components of the gas turbine engine 10 including, but not limited to, the compressor blade 24, or a combination of components. A flow path 40 may travel through the gas turbine engine 10, and may interact with the element 28. Although the element 28 is shown located upstream of the compressor blade 24, the element 28 may also be located upstream of the fan 18. Additionally, the element 28 may be located in a low pressure compressor or a high pressure compressor.

The compressor 11 may also include a second element 44 and a second mechanism 48. The second mechanism 48 may vary the orientation of the second element 44 in the same manner as the element 28 and mechanism 32. The mechanism 32 can be, for example, a linear actuator, a solenoid motor or a magnetic coupling. While only two elements 28, 44 and two mechanisms 32, 48 are shown, it can be understood that a plurality of both elements and mechanisms are within the scope of this disclosure, and that the plurality of mechanisms can vary the orientation of the plurality of elements. Further, the plurality of elements may be located in different areas of the gas turbine engine 10.

Figure 3:
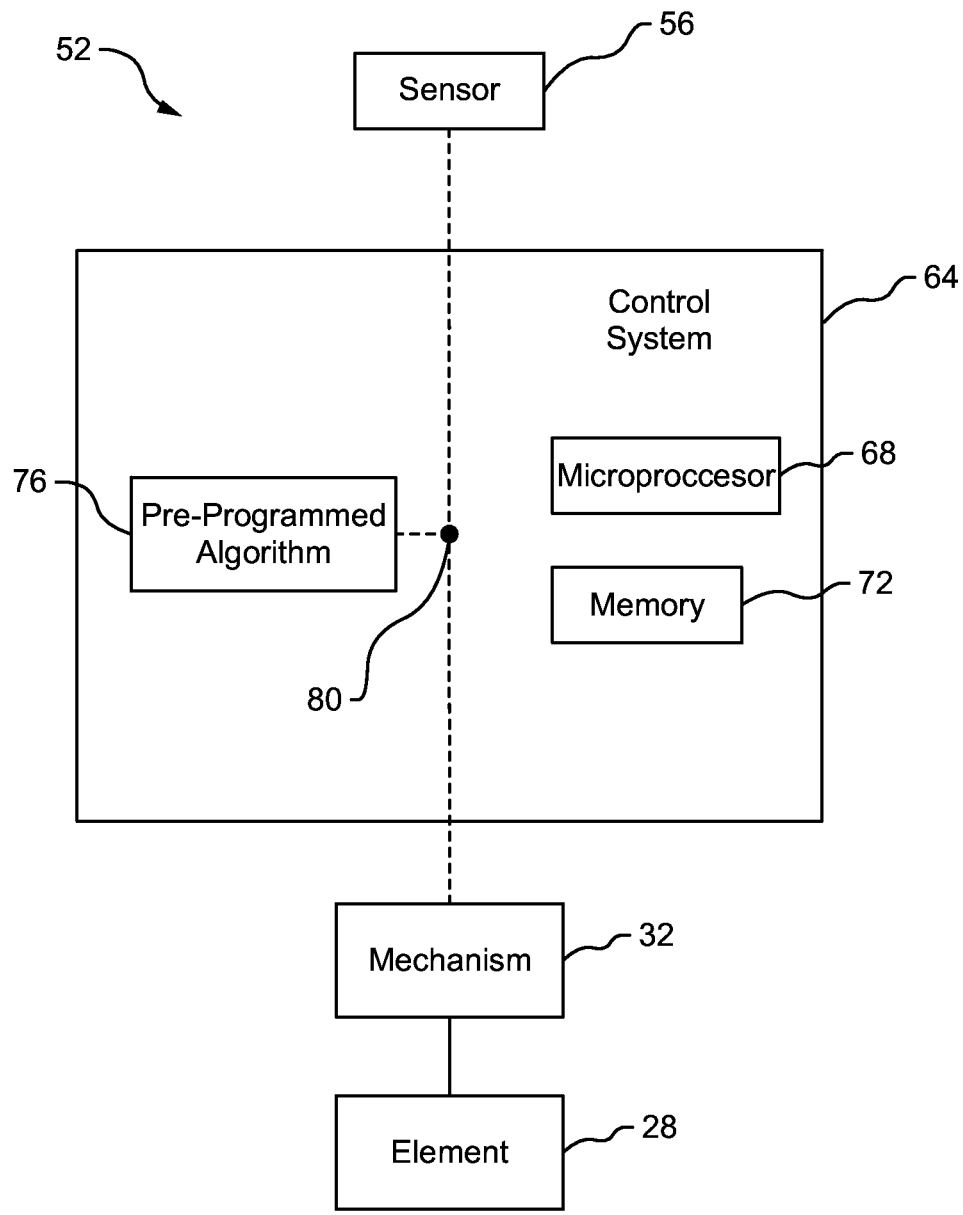
FIG. 3 is a schematic representation of a variable-geometry system constructed in accordance with an embodiment.

A variable-geometry system 52 for controlling the relative positions of the elements 28, 44 is shown in FIG. 3. The variable-geometry system 52 may include a sensor 56 for sensing a value of a parameter. The sensor 56 may be in electronic communication with a control system 64, and may communicate the sensed parameter value to the control system 64. The control system 64 may be a Full Authority Digital Electronic Control (FADEC) system, and may include a microprocessor 68 and a memory 72. Further, the control system 64 may incorporate a pre-programmed algorithm 76 pertaining to the parameter sensed by the sensor 56, as well as values and ranges of the parameter derived through analysis and testing.

Upon receiving parameter data from the sensor 56, the control system 64 may perform a comparison 80 between the sensor data and the stored parameter values and ranges. The stored parameter values and ranges may be included in the memory 72. The result of the comparison 80 may then be analyzed by the pre-programmed algorithm 76. Following this analysis, the pre-programmed algorithm 76 may associate a particular analysis result with a particular element 28 orientation. To achieve this element 28 orientation, the control system 64 may electronically instruct the mechanism 32 to vary the orientation of the element 28 according to the analysis result achieved by the pre-programmed algorithm 76. In this manner, sensor 56 data can be analyzed and used to orient the element 28.

The pre-programmed algorithm 76 may include parameter values and ranges according to testing, analysis or projections. The parameter values and ranges can be used in the comparison 80 with sensor 56 data to improve gas turbine engine 10 performance and operation by altering the orientation of the element 28 accordingly. Possible parameters may include, but are not limited to, ambient air water content, total air temperature, air speed, altitude or weight-on-wheels. Total temperature can also be called indicated air temperature, and weight-on-wheels indicates an aircraft's weight is being supported by its wheels, i.e., the airplane is on the ground.

In one embodiment, the control system 64 may include parameter values and ranges selected to improve gas turbine engine 10 operation in various types of weather conditions, particularly operations in inclement weather. The pre-programmed algorithm 76 may determine an indication of inclement weather conditions based on the specific parameter sensed and the comparison results between the stored values and ranges and the sensor 56 data. Such inclement weather conditions indicated may include ground freezing fog, fog, glaze ice, rime ice, hail, rain and ice crystals. Following this determination, the control system 64 may electronically communicate a desired element 28 orientation to the mechanism 32.

The variable-geometry system 52 may enable a gas turbine engine 10 to best operate in a variety of weather conditions. For example, the element 28 may orient within a range of possible orientations, which may include orienting from comparatively open to comparatively closed orientations, relative to the flow path 40. In addition, the control system 64 may instruct the element 28 to assume a relatively closed orientation when the control system 64 concludes hail conditions are likely, in order to improve the breaking or diversion of possible hail masses. Conversely, in the face of potential icing while operating at altitude, the element 28 may assume a relatively open position to reduce ice buildup in the gas turbine engine 10. Similarly, while operating in possible ground freezing fog conditions, the element 28 may assume a relatively open position to increase airflow and reduce ice buildup in the gas turbine engine 10. Through future enhancements to the pre-programmed algorithm 76 and control system 64, new inclement weather conditions could be accommodated and responded to by an update to the control system 64. In addition, other types of intelligent algorithms can be added to the control system 64 that can react dynamically based on unexpected weather or other conditions.

Further, in response to instructions from the control system 64 based on the comparison 80, the variable-geometry system 52 may vary the orientation of the element 28 and second element 44, via the mechanism 32 and second mechanism 48 independently or uniformly. As the scope of this disclosure includes a plurality of elements beyond the two shown (28, 44), the orientation of each of the plurality of elements may also be varied in response to instructions from the control system 64 based on the comparison 80.

Figure 4:
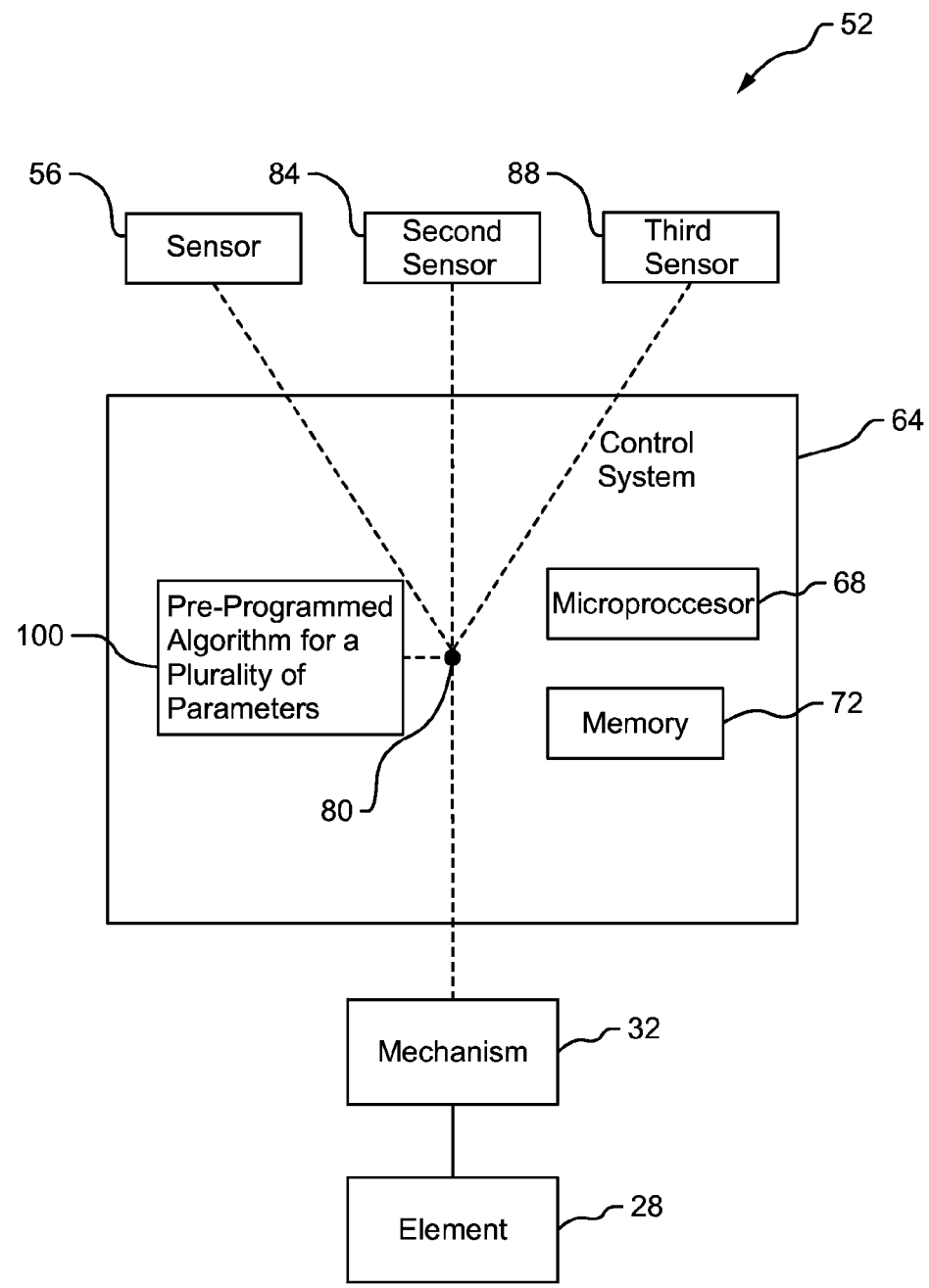
FIG. 4 is schematic representation of an alternate embodiment of the variable-geometry system of FIG. 3 constructed in accordance with an embodiment.

In another embodiment, the control system 64 may include a pre-programmed algorithm for a plurality of parameters 100, as shown in FIG. 4. The control system 64 may also include values and ranges derived through analysis and testing for a plurality of parameters selected to improve gas turbine engine 10 operation in various types of weather conditions, particularly operation in inclement weather. However, in this embodiment, the variable-geometry system 52 includes a sensor 56, a second sensor 84 and a third sensor 88. Although shown with three sensors 56, 84, 88, it is understood that a variable-geometry system 52 with more or fewer than three sensors 56, 84, 88 is within the scope of this disclosure.

Parameter data from the sensors 56, 84, 88 may be electronically communicated to the control system 64, which may perform a comparison 80 between the data and the stored parameter values and ranges. The result of the comparison 80 may then be analyzed by the pre-programmed algorithm for a plurality of parameters 100. Following this analysis, the pre-programmed algorithm for a plurality of parameters 100 may associate a particular analysis result with a particular element 28 orientation. To achieve this element 28 orientation, the control system 64 may electronically instruct the mechanism 32 to vary the orientation of the element 28 according to the analysis result. In this manner, sensor 56, 84, 88 data can be analyzed and used to orient the element 28.

The pre-programmed algorithm for a plurality of parameters 100 may include parameter values and ranges according to testing, analysis or projections. The parameter values and ranges can be used in the comparison 80 with sensor 56, 84, 88 data to improve gas turbine engine 10 performance and operation by altering the orientation of the element 28 accordingly. Each sensor 56, 84, 88 may be used to gather data on a distinct parameter. Possible parameters may include, but are not limited to, ambient air water content, total air temperature, air speed, altitude and weight-on-wheels. Total temperature can also be called indicated air temperature, and weight-on-wheels indicates an aircraft's weight is being supported by its wheels. In this embodiment, the control system 64 can command a particular element 28 orientation based on the analysis of the pre-programmed algorithm for a plurality of parameters 100 of a single parameter, a plurality of parameters or a combination of parameters.

In one embodiment, the control system 64 may include parameter values and ranges selected to improve gas turbine engine 10 operation in various types of weather conditions, particularly operation in inclement weather. The pre-programmed algorithm for a plurality of parameters 100 may determine an indication of inclement weather conditions based on the specific parameters sensed and the comparison results between the stored values and ranges and the sensor 56, 84, 88 data. Such inclement weather conditions determined may include ground freezing fog, fog, glaze ice, rime ice, hail, rain and ice crystals. Following this determination, the control system 64 may electronically communicate a desired element 28 orientation to the mechanism 32. Further, through future enhancements to the pre-programmed algorithm for a plurality of parameters 100 and control system 64, new inclement weather conditions could be accommodated and responded to by an update to the control system 64. In addition, other types of intelligent algorithms can be added to the control system 64 that can react dynamically based on unexpected weather or other conditions.

The present disclosure may allow for decreased stresses on gas turbine engine 10 components by enabling a greater resistance to various types of potentially adverse weather conditions. In turn, this may reduce maintenance time and costs. The disclosed system may also encourage more efficient gas turbine engine 10 operation during various types of inclement weather by avoiding ice buildup.

Figure 5:
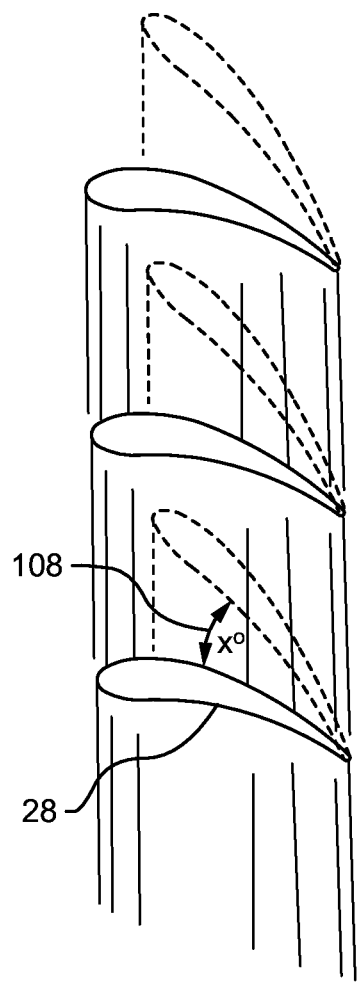
FIG. 5 is a schematic representation of an element of the variable-geometry system of FIG. 3 constructed in accordance with an embodiment.

A schematic representation of the element 28 of the variable-geometry system 52 is shown in FIG. 5. The element 28 is shown in one orientation, along with a range 108 of possible alternate element 28 orientations. The element 28 may assume any orientation within the range 108 of possible alternate element 28 orientations in response to commands from the control system 64, and may be infinitely variable within the range 108.

Figure 6:
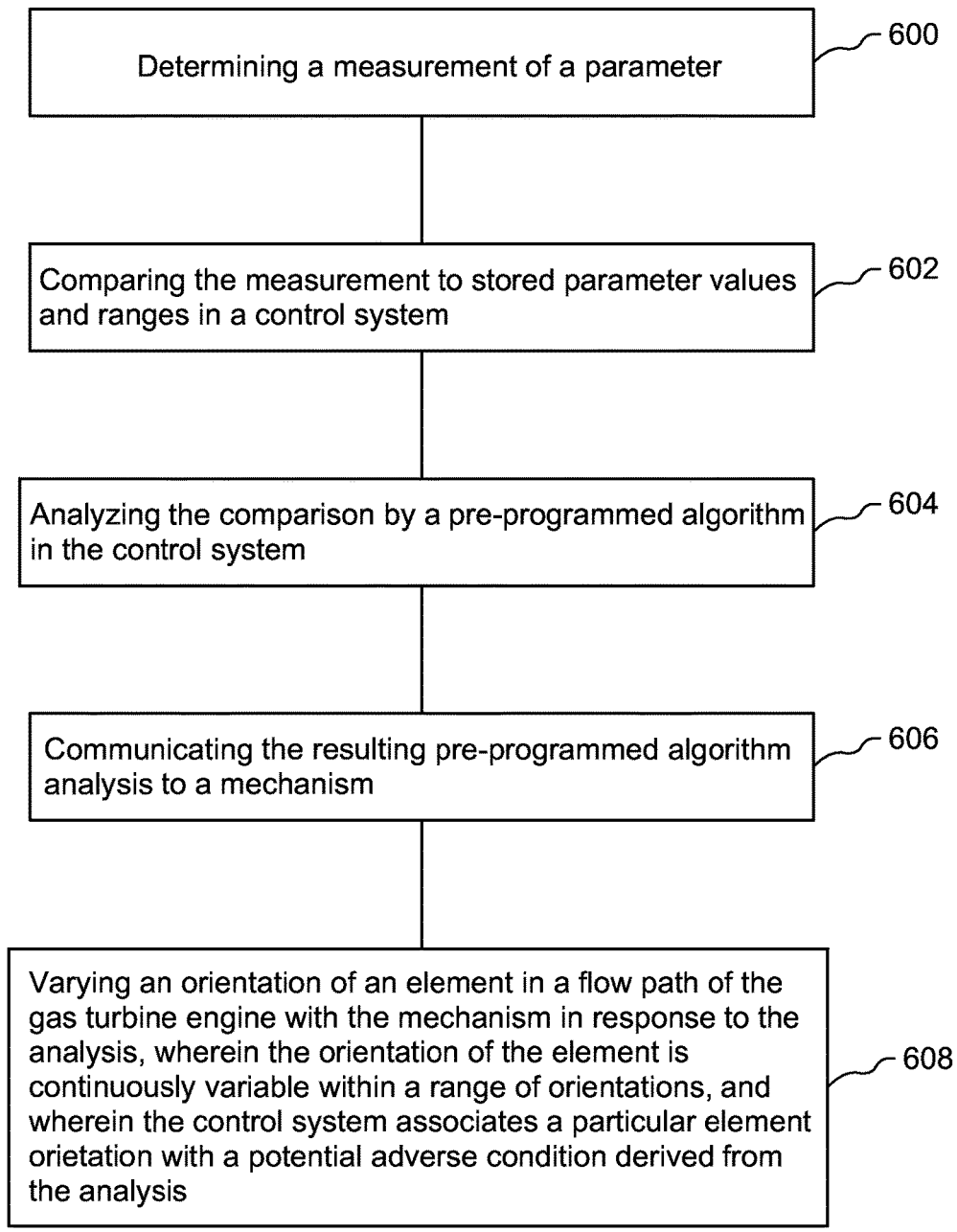
FIG. 6 is a flowchart depicting a sample sequence of actions and events which may be practiced in accordance with an embodiment.

FIG. 6 depicts a method for scheduling vane orientation in a gas turbine engine, according to an embodiment. The method may comprise determining a measurement of a parameter, as shown in block 600, comparing the measurement to stored parameter values and ranges in a control system, as shown in block 602, analyzing the comparison by a pre-programmed algorithm in the control system, as shown in block 604, communicating the resulting pre-programmed algorithm analysis to a mechanism, as shown in block 606, and varying the orientation of an element in a flow path of the gas turbine engine with the mechanism in response to the analysis, wherein the orientation of the element is continuously variable within a range of orientations, and wherein the control system associates a particular element orientation with a potential adverse condition derived from the analysis, as shown in block 608.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

In operation, the present disclosure sets forth a variable-geometry system for a gas turbine engine which can find industrial applicability in a variety of settings. For example, the disclosure may be advantageously employed by gas turbine engines 10 in aviation, naval and industrial settings. More specifically, the variable-geometry system for a gas turbine engine can be used to enable enhanced operation in a variety of inclement weather conditions by varying the orientation of one or more elements.

The present disclosure allows for decreased stresses on gas turbine engine components caused by weather, and thereby may reduce engine maintenance time and costs. The disclosed system may also encourage more efficient gas turbine engine operation during various types of inclement weather.

The variable-geometry system for a gas turbine engine of the present disclosure contributes to a gas turbine engine's continued and efficient operation. The disclosed system may be original equipment on new gas turbine engines, or added as a retrofit to existing gas turbine engines.

The invention claimed is:

1. A variable-geometry system for a gas turbine engine, comprising:
a sensor configured to sense a parameter;
a control system in electronic communication with the sensor, the control system including a pre-programmed algorithm and configured to compare data from the sensor to stored parameter values and ranges to determine a particular inclement weather condition from among a plurality of different inclement weather conditions;
a mechanism in communication with the control system; and
an element in a flow path of the gas turbine engine, wherein the mechanism is configured to vary an orientation of the element in response to the pre-programmed algorithm and the control system's comparison between data from the sensor and the stored parameter values and ranges, wherein the orientation of the element is infinitely variable within a range of orientations, wherein the parameter is selected from the group consisting of total temperature, airspeed, or weight-on-wheels, wherein the control system is configured to associate a particular element orientation with a potential adverse condition derived from the comparison between data from the sensor and the stored parameter values and ranges,
wherein the control system controls the mechanism to place the element in a first orientation in response to detecting a first inclement weather condition from the among the plurality of inclement weather conditions, and controls the mechanism to place the element in a second orientation in response to detecting a second inclement weather condition from among the plurality of inclement weather conditions different from the first inclement weather condition.

2. The variable-geometry system of claim 1, further including a plurality of sensors configured to sense a plurality of parameters, wherein the control system includes a pre-programmed algorithm for a plurality of parameters and is configured to compare data from the plurality of sensors to stored parameter values and ranges, wherein the mechanism is configured to vary the orientation of the element in response to a control system's comparison between data from the plurality of sensors and the stored parameter values and ranges.

3. The variable-geometry system of claim 2, wherein the control system is configured to associate a particular element orientation with a potential adverse condition derived from the comparison between the stored parameter values and the data from the plurality of sensors.

4. The variable-geometry system of claim 2, wherein the plurality of parameters are selected from the group consisting of total temperature, water content of ambient air, airspeed, altitude or weight-on-wheels.

5. The variable-geometry system of claim 1, wherein the gas turbine engine includes a plurality of elements and a plurality of mechanisms, and the mechanisms are configured to vary the orientations of the elements in response to the control system's comparison between data from the sensor and the stored parameter values and ranges.

6. The variable-geometry system of claim 1, wherein the potential adverse condition is selected from the group consisting of ground freezing fog, glaze ice, rime ice, hail, rain or ice crystals.

* * * * *